(12) United States Patent
Kasuya et al.

(10) Patent No.: US 8,896,692 B2
(45) Date of Patent: Nov. 25, 2014

(54) APPARATUS, SYSTEM, AND METHOD OF IMAGE PROCESSING, AND RECORDING MEDIUM STORING IMAGE PROCESSING CONTROL PROGRAM

(75) Inventors: Yuuji Kasuya, Kanagawa (JP); Keiji Omura, Kanagawa (JP); Tadashi Araki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 515 days.

(21) Appl. No.: 13/291,696

(22) Filed: Nov. 8, 2011

(65) Prior Publication Data

US 2012/0113255 A1 May 10, 2012

(30) Foreign Application Priority Data

Nov. 10, 2010 (JP) ................................. 2010-251722

(51) Int. Cl.
*H04N 7/00* (2011.01)
*H04N 5/225* (2006.01)
*G09G 5/00* (2006.01)
*H04N 7/18* (2006.01)

(52) U.S. Cl.
CPC ....................................... *H04N 7/18* (2013.01)
USPC ......... 348/143; 348/207.1; 345/156; 345/634

(58) Field of Classification Search
USPC .................................................... 348/41–161
See application file for complete search history.

(56) References Cited

U.S. PATENT DOCUMENTS

| 2001/0035976 | A1* | 11/2001 | Poon ............................. 358/1.15 |
| 2005/0180631 | A1* | 8/2005 | Zhang et al. ................... 382/173 |
| 2007/0222747 | A1* | 9/2007 | Kritt et al. ..................... 345/156 |
| 2010/0192107 | A1* | 7/2010 | Takahashi ...................... 715/856 |
| 2011/0205370 | A1* | 8/2011 | Griffin et al. ............... 348/207.1 |
| 2011/0210908 | A1 | 9/2011 | Kasuya et al. |
| 2011/0221773 | A1* | 9/2011 | Kasuya et al. ................. 345/634 |

FOREIGN PATENT DOCUMENTS

JP 2005-253067 9/2005

* cited by examiner

*Primary Examiner* — Joseph Ustaris
*Assistant Examiner* — Talha Nawaz
(74) *Attorney, Agent, or Firm* — Oblon, Spivak, McClelland, Maier & Neustadt, L.L.P.

(57) ABSTRACT

An image processing apparatus at one site obtains a currently captured image that includes a drawing image of a drawing area of a drawing object and an image of a peripheral area of the drawing object, determines whether the drawing image changes from a time when a previously captured image is obtained, and transmits a differential image that reflects the drawing image to a counterpart site.

12 Claims, 6 Drawing Sheets

APPARATUS, SYSTEM, AND METHOD OF IMAGE PROCESSING, AND RECORDING MEDIUM STORING IMAGE PROCESSING CONTROL PROGRAM

CROSS-REFERENCE TO RELATED APPLICATIONS

This patent application is based on and claims priority under 35 U.S.C. §119 to Japanese Patent Application No. 2010-251722, filed on Nov. 10, 2010, in the Japan Patent Office, the entire disclosure of which is hereby incorporated herein by reference.

FIELD OF THE INVENTION

The present invention relates to an apparatus, system, and a method of image processing and a recording medium storing an image processing control program, and more specifically to an apparatus, system, and a method of processing an image to be shared among a plurality of remotely located sites and a recording medium storing an image processing control program for processing an image to be shared among a plurality of remotely located sites.

BACKGROUND

The recent technology allows image data to be shared among a plurality of remotely located sites to facilitate communication among the plurality of sites. For example, an image capturing device such as a video camera, an image processing apparatus, and a projection device may be provided at each site. The image capturing device at a first site captures an image of a whiteboard surface at its own site. The image processing apparatus obtains a drawing image drawn by a user onto the whiteboard from the captured image, and transmits the drawing image to the other site for projection onto a whiteboard at the other site, thus allowing the drawing image of each site to be shared among the plurality of sites, for example, as described in U.S. Pat. No. 7,496,229.

The above-described technology of exchanging the drawing images among different sites tends to have low frame rates. More specifically, after the projection device projects the image received from the other site onto the whiteboard, the image processing apparatus usually waits for a few hundred milliseconds before it instructs the image capturing device to capture the image from the whiteboard for further processing. While this results in higher stability of the captured image, it creates another problem as waiting for a predetermined time period before capturing tends to reduce an overall number of images to be transmitted to the other site for a predetermined time period, thus making difficult to obtain higher frame rates.

SUMMARY

In view of the above, one aspect of the present invention is to provide an apparatus, method, system, and computer program and product, each capable of controlling a number of images to be transmitted to the other site for a predetermined time period, i.e., the frame rate, such that more images are transmitted to the other site when higher frame rates are preferable. For example, when the captured image contains a drawing image that keeps changing as the user modifies the drawings, it is preferable to have higher frame rates.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
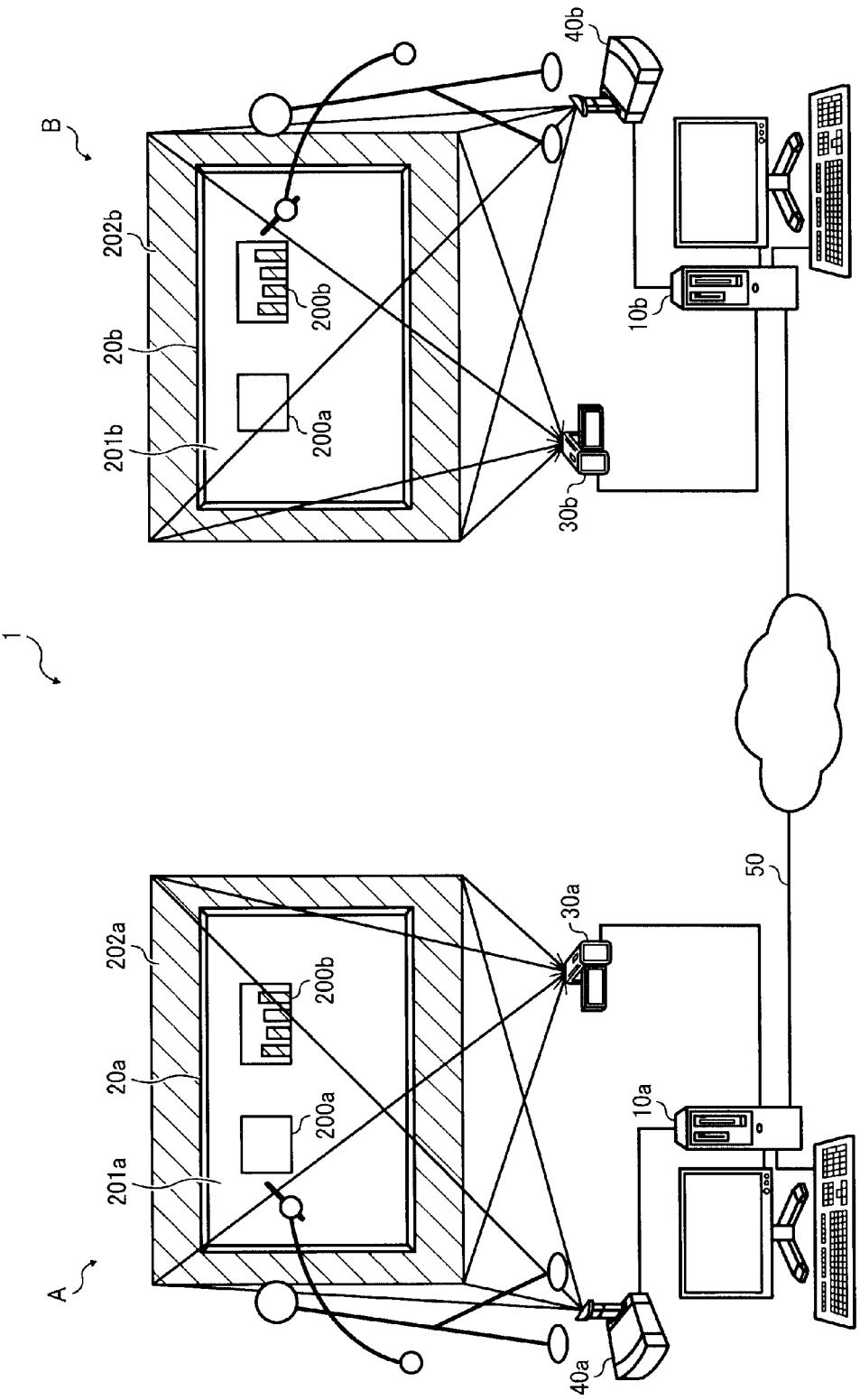
FIG. 1 is a schematic diagram illustrating a configuration of an image processing system, according to an example embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF EXAMPLE EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

Referring now to FIGS. 1 to 6, example embodiments of the present invention are explained. FIG. 1 is a schematic block diagram illustrating a configuration of an image processing system 1, according to an example embodiment of the present invention.

The image processing system 1 of FIG. 1 includes two sites including a site A and a site B, which are remotely located from each other. For example, a user at the site A and a user at the site B are made communicable with each other through a communication network 50 such as the Internet, local area network (LAN), or wide area network (WAN). In FIG. 1, only two sites A and B are shown for the descriptive purposes. Alternatively, the image processing system 1 may be designed to include more than two sites. Further, any desired number of sites may be made communicable with one another through a leased line.

The site A is provided with an image processing apparatus 10a, a drawing object 20a, an image capturing device 30a, and a projection device 40a. The site B is provided with an image processing apparatus 10b, a drawing object 20b, an image capturing device 30b, and a projection device 40b, which are similar in function and structure to the image processing apparatus 10a, drawing object 20a, image capturing device 30a, and projection device 40a, which are each provided at the site A. In this example, the image processing apparatuses 10a and 10b are each or collectively referred to as the image processing apparatus 10. The drawing objects 20a and 20b are each or collectively referred to as the object 20. The image capturing devices 30a and 30b are each or collectively referred to as the image capturing device 30. The projection devices 40a and 40b are each or collectively referred to as the projection device 40.

The object 20 allows the user at its own site to draw thereon any desired drawings, while displaying thereon an image that is projected by the projection device 40. For example, the object 20 may be implemented by any desired material on which a user can draw any drawings 200 such as characters or figures, such as a white board, a black board, or a paper sheet. The user may draw an image, such as the drawings 200, using any desired writing tool such as whiteboard marker. The object 20 further displays thereon an image projected by the projection device 40, which includes the drawings 200 drawn by the user at the other site. In this example, on the object 20, there is a drawing area 201 on which the drawings 200 drawn by the user and the projection image are displayed. The drawing area 201 is to be shared with the remotely located site such that it may be referred to as an area to be shared. Any peripheral area that surrounds the drawing area 201 is referred to as a peripheral area 202 of the drawing area 201.

The image processing apparatus 10 is connected to the image capturing device 30a and the projection device 40 through a cable such as a universal serial bus (USB) cable. The image processing apparatus 10 extracts a drawing image that reflects the drawings 200 drawn onto the object 20 from the captured image that is captured by the image capturing device 30, and sends the drawing image to the image processing apparatus 10 at the other site through the communication network 50. The image processing apparatus 10 further causes the projection device 40 to display a drawing image that reflects the drawings 200 drawn onto the object 20 at the other site and received from the other site, onto the drawing area 201 of the object 20 at its own site. In this manner, the drawing image that reflects drawings drawn by each user is shared among a plurality of sites. The image processing apparatus 10a may be implemented by any desired computer such as a notebook computer or a desktop computer.

The image capturing device 30 captures the drawing area 201 including the drawings 200 and the projection image that is projected by the projection device 40, and the peripheral area 202 to generate a captured image. As illustrated in FIG. 1, any foreground object that is positioned between the object 20 and the image capturing device 30 may be captured either as the image of the peripheral area 202 or the image of the drawing area 201. The image capturing device 30 may be implemented by a digital camera, digital video camera, web camera, etc. In one example, the image capturing device 30 captures the image including the drawing area 201 and the peripheral area 202 according to an instruction received from the image processing apparatus 10, for example, when the image processing apparatus 10 determines that a predetermined time period elapses after the image from the other site is projected. Alternatively, the image capturing device 30 may continuously capture the image including the drawing area 201 and the peripheral area 202, and sends the captured image only when an instruction from the image processing apparatus 10 is received.

The projection device 40, which may be implemented by a projector, projects the drawing image received from the other site to the object 20. For example, the image processing apparatus 10a receives the drawing image that reflects the drawings 200b, which is generated at the site B, from the image processing apparatus 10b through the network 50, and stores the received image in the memory of the image processing apparatus 10 for projection onto the drawing area 201a of the object 20a.

The communication network 50 allows the image processing apparatus 10a and the image processing apparatus 10b to communicate with each other such that various data are transmitted or received between these apparatuses.

Further, a structure of the image processing system 1 is not limited to this example shown in FIG. 1. For example, the projection device 40, the image capturing device 30, and the image processing apparatus 10 may be incorporated into one apparatus. In another example, the image processing system 1 may be additionally provided with a server that manages data to be shared among the plurality of remotely located sites A and B through the image processing apparatuses 10a and 10b.

<Hardware Structure of Image Processing Apparatus>

Next, a hardware structure of the image processing apparatus 10 is explained according to an example embodiment of the present invention.

Figure 2:
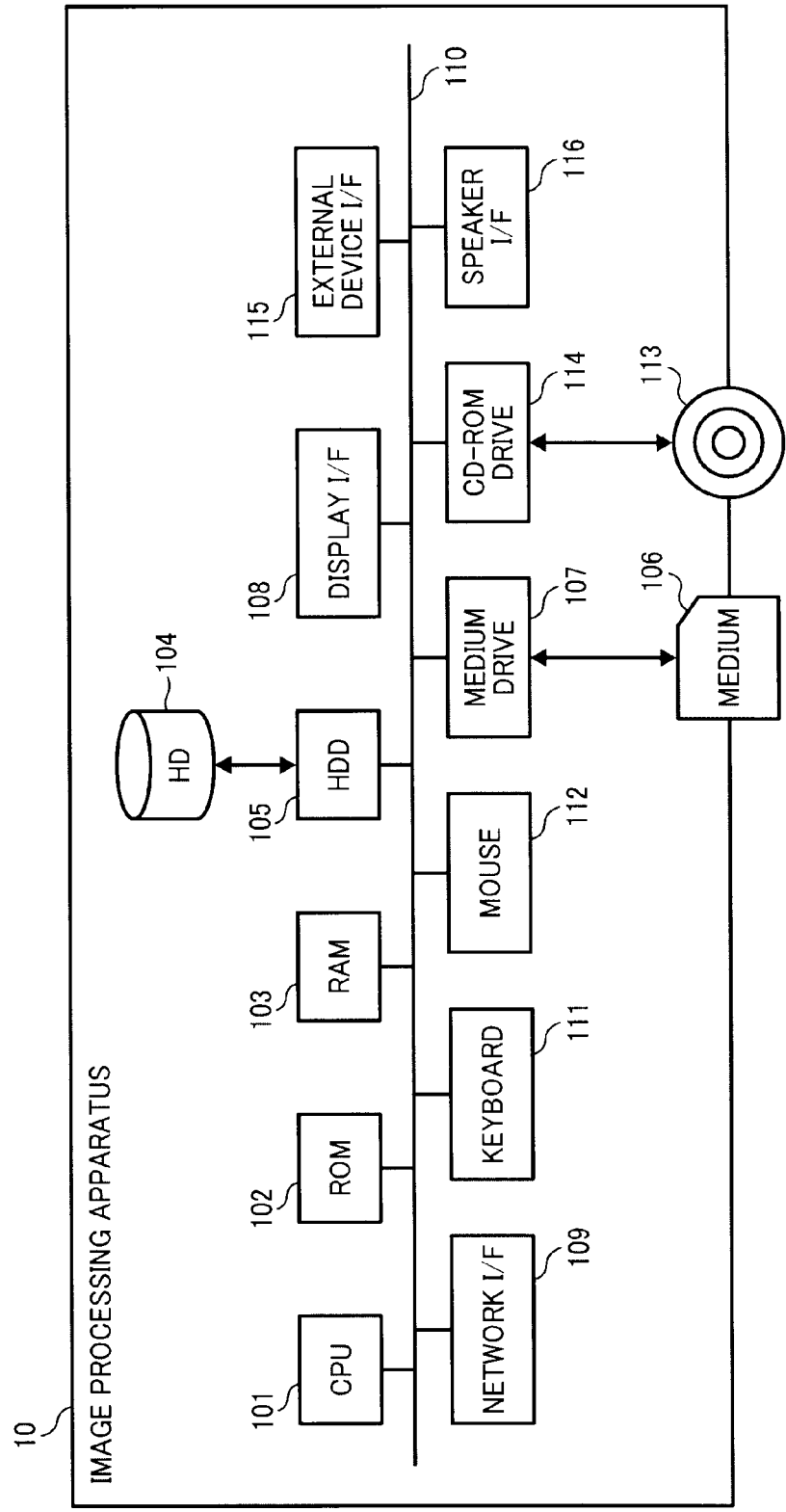
FIG. 2 is a schematic block diagram illustrating a hardware structure of an image processing apparatus of the image processing system of FIG. 1.

FIG. 2 illustrates a hardware structure of the image processing apparatus 10. The image processing apparatus 10 includes a central processing unit (CPU) 101, a read only memory (ROM) 102, a random access memory (RAM) 103, a hard disk (HD) 104, a hard disk drive (HDD) 105, a medium drive 107, a display interface (I/F) 108, a network interface (I/F) 109, a keyboard 111, a mouse 112, a CD-ROM drive 114, an external device interface (I/F) 115, and a speaker interface (I/F) 116, which are electrically connected through a bus line 110 such as an address bus or a data bus. The CPU 101 controls entire operation of the image processing apparatus 10. The ROM 102 stores therein a control program for execution by the CPU 101, such as an image processing control program. The RAM 103 functions as a work area of the CPU 101. The HD 104 stores therein various data such as image data. The HDD 105 controls reading or writing of various data with respect to the HD 104 under control of the CPU 101. The medium drive 107 controls reading or writing of various data with respect to a removable recording medium 106 such as a flash memory. The display I/F 108 displays various data such as a cursor, menu, window, characters, or images through a display such as a display (FIG. 1) provided with the image processing apparatus 10. The network I/F 109 allows the image processing apparatus 10 to transmit data through the communication network 50. The keyboard 111 is provided with a plurality of keys to allow the user to input characters, numerals, and various instructions. The mouse 112 allows the user to input a user instruction including, for example, selection or execution of a specific instruction, selection of an area to be processed, and instruction of cursor movement. The CD-ROM drive 114 controls reading or writing of various data with respect to a CD-ROM 113, which is one example of a removable recording medium. The external device I/F 115 allows transmission or reception of data with an external device such as the image capturing device 30 or the projection device 40. The speaker I/F 116 outputs sounds such as voices based on sound data, for example, through an internal speaker provided in the image processing apparatus 10.

The image processing control program may be written onto a recording medium that is readable by a general-purpose computer such as the recording medium 106 or the CD-ROM 113 in any format that is installable or executable by the general-purpose computer. Once the image processing control program is written onto the recording medium, the recording medium may be distributed. For example, upon execution of the image processing control program, the CPU 101 causes the image processing apparatus 100 to operate or function as an apparatus that processes image data to be shared with the other site and transmit the processed image data to the other site.

Figure 3:
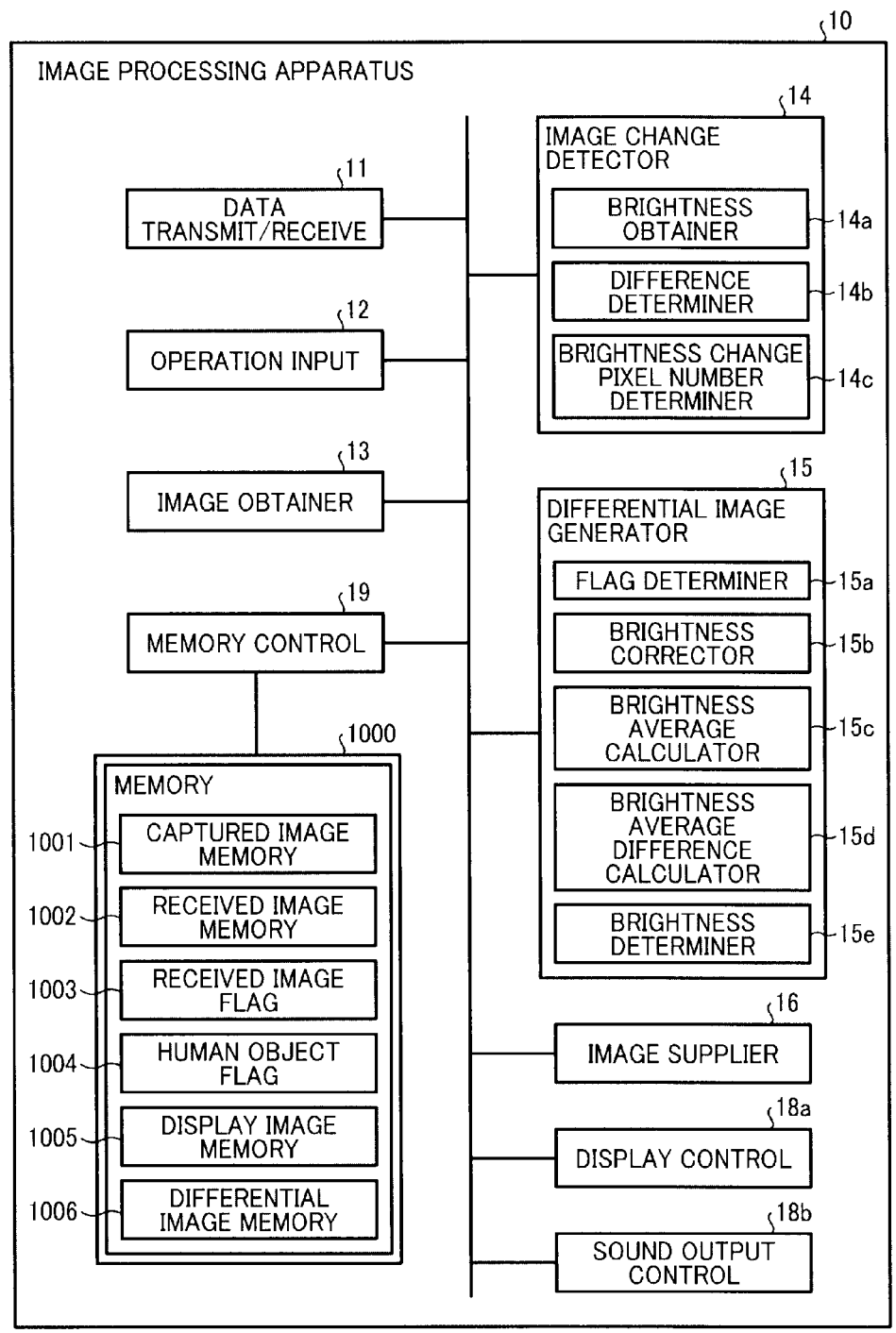
FIG. 3 is a schematic block diagram illustrating a functional structure of the image processing apparatus of FIG. 2.

Next, a functional structure of the image processing apparatus 10 of FIG. 2 is explained according to an example embodiment of the present invention. FIG. 3 illustrates a functional structure of the image processing apparatus 10. The image processing apparatus 10 includes a data transmit/receive 11, an operation input 12, an image obtainer 13, an image change detector 14, a differential image generator 15, an image supplier 16, a display control 18a, a sound output control 18b, and a memory control 19. These units shown in FIG. 3 correspond to a plurality of functions or functional modules, which are executed according to an instruction of the CPU 101 (FIG. 2) that is generated according to the image processing control program being loaded from the ROM 102 onto the RAM 103. The image processing apparatus 10 further includes a memory 1000, which may be implemented by any one of the ROM 102, RAM 103, and HDD 105.

(Functional Structure of Image Processing Apparatus)

Next, a functional structure of the image processing apparatus 10 is explained. The data transmit/receive 11, which may be implemented by the network I/F 109 (FIG. 2), transmits or receives various data or information to or from another device or system, through the communication network 50. In this example, it is assumed that the image processing apparatus 10a transmits or receives data to or from the image processing apparatus 10b either directly, or indirectly through a server, via the network 50. Further, as described below, under control of the CPU 101, a number of drawing images to be transmitted to the other site for a predetermined time period through the data transmit/receive 11 is changed based on a number of differential images that are generated by the differential image generator 15 according to determination made by the image change detector 14.

The operation input 12 receives a user instruction input by the user through the keyboard 111 or the mouse 112 (FIG. 2) under control of the instructions received from the CPU 101.

The image obtainer 13, which may be implemented by the external device I/F 115, obtains the captured image that is captured by the image capturing device 30 through such as a cable. Further, the image obtainer 13 transmits the drawing image at the other site, which is received from the image processing apparatus 10 at the other site, to the projection device 40 for projection onto the object 20, specifically, the drawing area 201 of the object 20.

Further, in this example, the image obtainer 13 specifies the drawing area 201 of the object 20 that is to be shared with the remotely located site, using a maker image including markers that are respectively positioned at four corners of the marker image when the marker image is displayed onto the object 20 through the projection device 40. Using the markers of the marker image, the image obtainer 13 may calculate a size of the drawing area 201 that is specified by the markers. More specifically, when the image obtainer 13 receives notification from the image supplier 16 that the marker image is projected onto the object 20 through the projection device 40, the image obtainer 13 causes the image capturing device 30 to capture the image of the object 20, and applies perspective transformation to the captured image obtained from the image capturing device 30. The image obtainer 13 detects the coordinate value of each of the markers from the captured image, and specifies the drawing area 201a based on assumption that the detected coordinate values of the markers correspond to the coordinate values of the corners of the drawing area 201. The image obtainer 13 calculates the size of the drawing area 201 using the corner coordinate values of the drawing area 201. The corner coordinate values and the size of the drawing area 201 are stored in a memory of the image processing apparatus 10.

Once the coordinate values of the drawing area 201 are specified, the image obtainer 13 further specifies the peripheral area 202, for example, by respectively adding a predetermined value to the coordinate values of the drawing area 201. Information regarding the coordinate values and/or the size of the peripheral area 202 may be stored in the memory of the image processing apparatus 10. Alternatively, the peripheral area 202 may be determined based on information regarding the coordinate values of the drawing area 201 and a maximum image size that can be obtained by the image capturing device 30.

The image change detector 14 determines whether the drawing image that reflects the drawings 200 at its own site have changed for a predetermined time period based on comparison between the currently obtained captured image and the previously obtained captured image. In order to detect the change between the captured images, i.e., frames, only for the drawing image at its own site, the projection image that is generated based on the drawing image of the other site that is received from the other site should be removed from the captured image.

In one example, the image change detector 14 obtains the drawing image by deleting the projection image that is currently projected onto the object 20 from the captured image obtained from the image obtainer 13. The obtained image is then compared between two time frames to detect whether there is change in the drawing image.

In another example, the image change detector 14 extracts an image of the peripheral area 202 of the object 20 from the captured image to determine whether the captured image contains a foreground object image in the peripheral area 202. For example, as illustrated in FIG. 1, when a user is drawing the drawings 200, the image capturing device 30 is most likely to capture the image of at least a portion of the user who stands in front of the object 20, in addition to the drawing area 201 including the drawings 200 drawn by the user. Since the drawings 200 are changed by the user, it is most likely that the captured image contains an image of the user, i.e., the foreground object image, when the drawing image changes. Based on this assumption, the image change detector 14 extracts the peripheral area 202 from the captured image to determine whether the peripheral area 202 contains any foreground object image. When the foreground object image is extracted from the peripheral area 202, the image change detector 14 determines that the user is drawing the drawings 200 on the object 20, and that the drawing image is most likely to be changed. In this manner, the change in the drawing image at its own site can be easily detected, without being influenced by the change in projection image of the counterpart site that is projected on the object 20.

Still referring to FIG. 3, the image change detector 14 includes a brightness obtainer 14a, a difference determiner 14b, and a brightness change pixel number determiner 14c. The brightness obtainer 14a obtains the brightness of a target pixel in the captured image currently obtained by the image obtainer 13.

The difference determiner 14b subtracts, from the brightness of the target pixel in the captured image data obtained by the brightness obtainer 14a, the brightness of a pixel that corresponds to the target pixel in the previously captured image data that was captured in prior to capturing of the currently obtained captured image data to obtain a difference in brightness. In this example, the target pixel may be selected from the peripheral area 202 in the captured image data. The difference determiner 14b determines whether the difference in brightness exceeds a predetermined threshold for the target pixel.

The brightness change pixel number determiner 14c counts a number of pixels that are determined by the difference determiner 14b that the difference exceeds the threshold, and determines whether the number of counted pixels is equal to or greater than a predetermined number. When it is determined that the number of counted pixels is equal to or greater than the threshold, the brightness change pixel number determiner 14b determines that the captured image data contains an image of a foreground object, that is, an image of a human object. The brightness change pixel number determiner 14b then causes the memory control 19 to turn on the human object flag 1004 in the memory 1000 for the captured image data to "ON". When it is determined that the number of counted pixels is less than the threshold, the brightness change pixel number determiner 14c determines that the captured image data does not contain an image of a human object, and causes the memory control 19 to turn off the human object flag 1004 in the memory 1000 to "OFF".

The differential image generator 15 generates a differential image, which indicates the difference between the captured image and the projection image that is supplied to the projection device 40. For the descriptive purposes, the projection image being projected or to be projected by the projection device 40 onto the object 20 may be referred to as the display image.

The differential image generator 15 includes a flag determiner 15a, a brightness corrector 15b, a brightness average calculator 15c, a brightness average difference calculator 15d, and a brightness determiner 15e. The flag determiner 15a, determines whether the received image flag 1003 stored in the memory 1000 is turned on or off. When the flag determiner 15a, determines that the received image flag 1003 is "ON", the brightness average calculator 15c calculates a brightness average value of a target pixel in the captured image data and the display image data. The brightness average difference calculator 15d calculates an average brightness difference of the target pixel, specifically, by subtracting the brightness average value calculated by the brightness average calculator 15c from the brightness of the target pixel for the captured image data and the display image data. The brightness determiner 15e determines the brightness value of each pixel in the differential image to be generated, based on the average brightness difference calculated by the brightness average difference calculator 15d.

The image supplier 16 supplies the drawing image of the other site, which is stored in the received image memory 1002, to the projection device 40 for projection onto the object 20. The image supplier 16 stores the projection image, which is displayed by the projection device 40 onto the object 20, in the display image memory 1005.

The display control 18a, which may be implemented by the display I/F 108 (FIG. 2), controls display of the image data onto the display connected to the image processing apparatus 10. In this example, the drawing images at both sites are displayed onto the drawing area 201 of the object 20. Alternatively, the image processing apparatus 10 may display the drawing images onto the display through the display control 18a. In such case, the display is provided with a touch panel screen that allows the user to draw any drawings onto the screen. The sound output control 18b, which may be implemented by the speaker I/F 116 (FIG. 2), controls output of sound data through the internal speaker of the image processing apparatus 10. The display control 18a and the sound output control 18b may be optionally provided.

The memory control 19, which may be implemented by the ROM 102, RAM 103, and/or HDD 105 of FIG. 2 in cooperation with the CPU 101, writes various data to the memory 1000 or reads various data from the memory 1000.

The memory 1000 includes a captured image memory 1001, a received image memory 1002, a display image memory 1005, and a differential image memory 1006.

The captured image memory 1001 stores the captured image, which is obtained by the image obtainer 13 from the image capturing device 30. In one example, when writing the captured image data to the memory 1001, the captured image memory 1001 may overwrite the previously stored captured image data with the newly captured image data. The received image memory 1002 stores therein the differential image, or the drawing image, generated at the counterpart site, which is received by the data transmit/receive 11 from the image processing apparatus 10 at the counterpart site. In one example, the received image memory 1002 may overwrite the previously stored received image data with the newly obtained received image data.

The display image memory 1005 stores the projection image data, which is supplied by the image supplier 16 from the received image memory 1002 and is currently displayed through the projection device 40. The differential image memory 1006 stores therein the differential image data generated by the differential image generator 105, which is to be transmitted to the counterpart site.

The memory 1000 further stores the value of a received image flag 1003. The received image flag 1003 indicates whether the received image memory 1002 stores therein the received image data. When the received image data is stored, the received image flag 1003 is set to "ON". When the received image data is not stored, the received image flag 1003 is set to "OFF".

The memory 1000 further stores the value of a human object flag 1004. The human object flag 1004 indicates whether the image change detector 14 determines that the currently obtained captured image contains an image of a human object. When the image change detector 14 detects the human object image, the human object flag is set to "ON". When the image change detector 14 does not detect the human object image, the human object flag is set to "OFF".

<Operation of Image Processing System>

Figure 4:
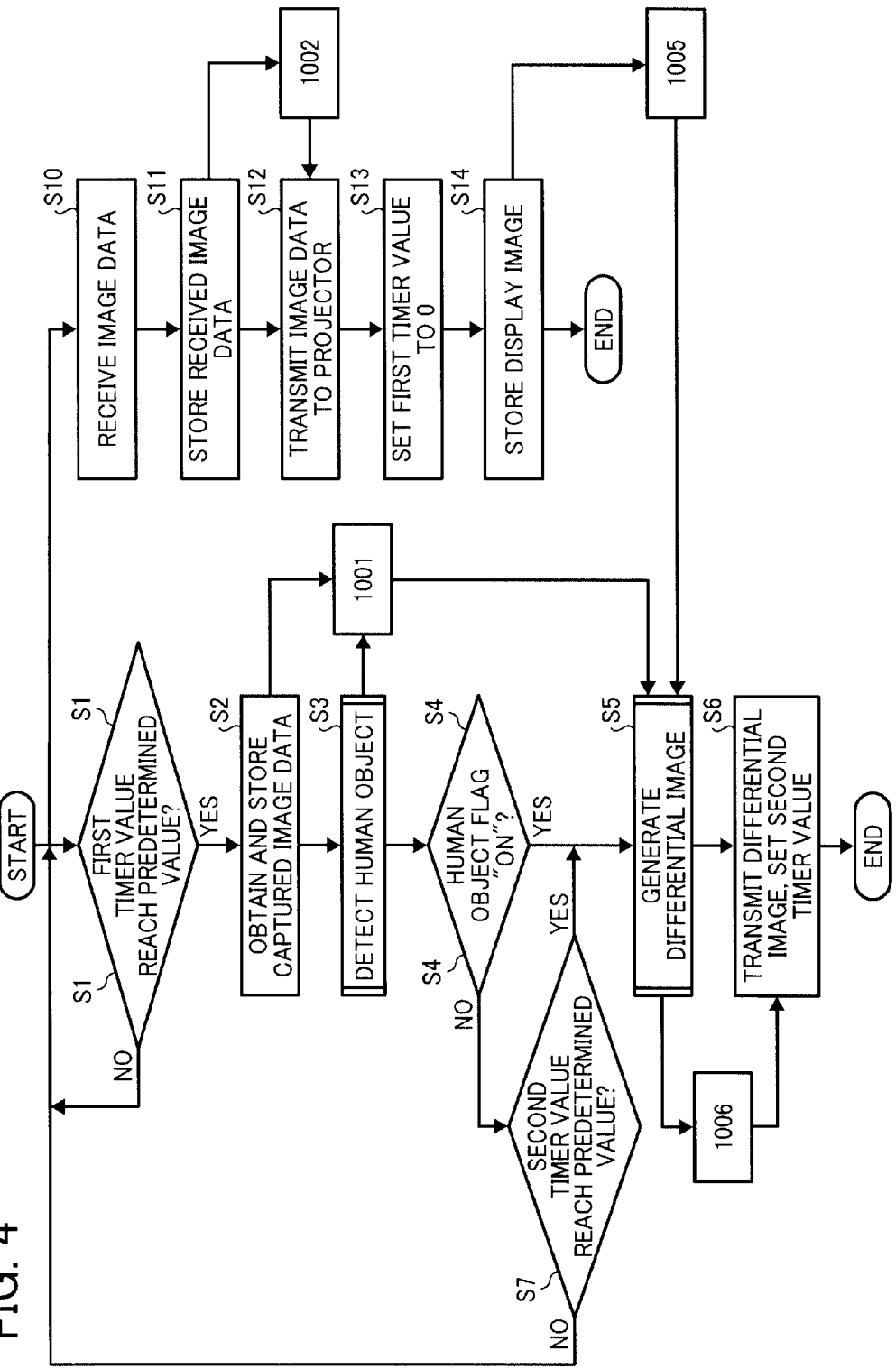
FIG. 4 is a flowchart illustrating operation of processing captured image data and received image data, performed by the image processing apparatus of FIG. 2.
Figure 5:
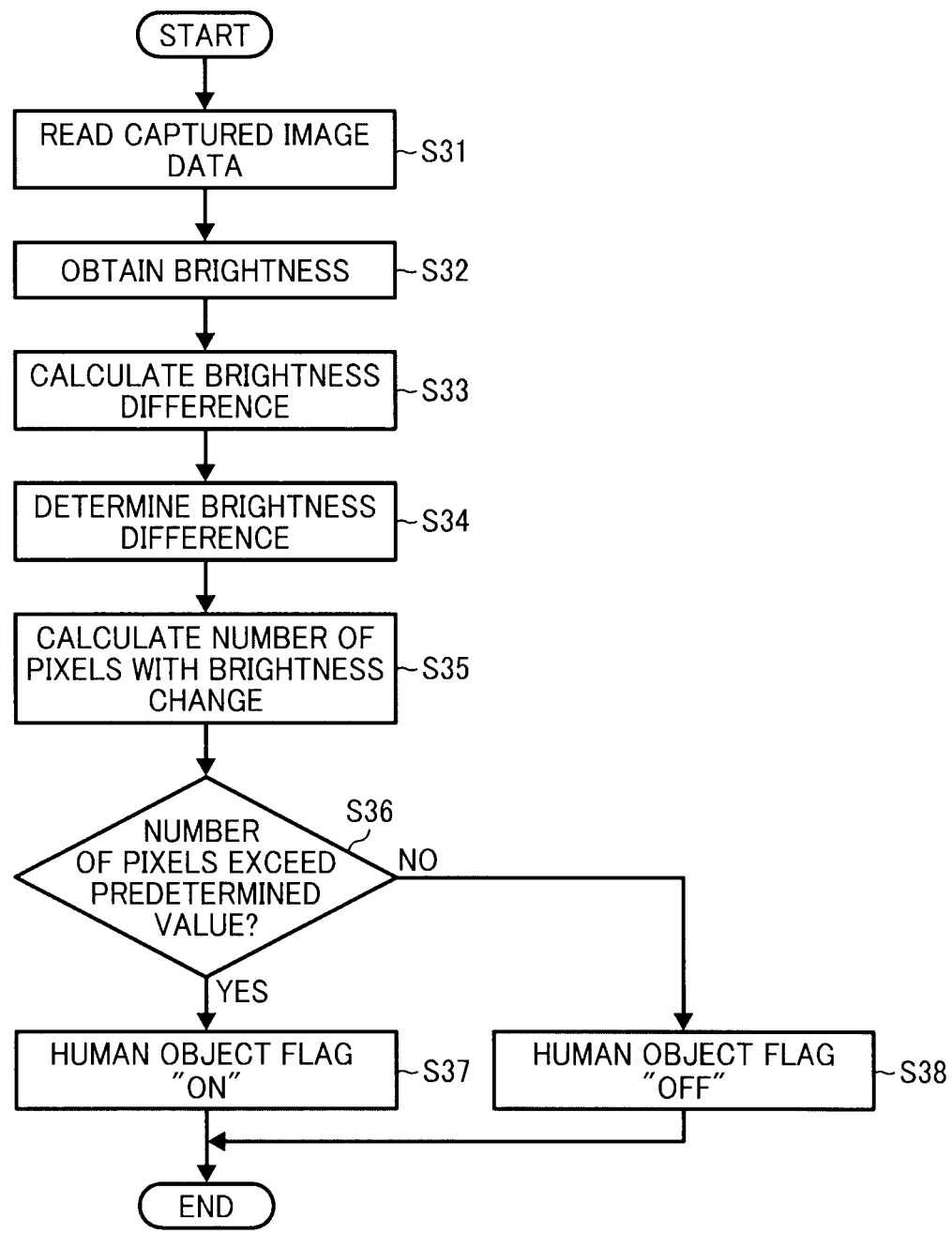
FIG. 5 is a flowchart illustrating operation of detecting the change in the captured image data, performed by the image processing apparatus of FIG. 2.
Figure 6:
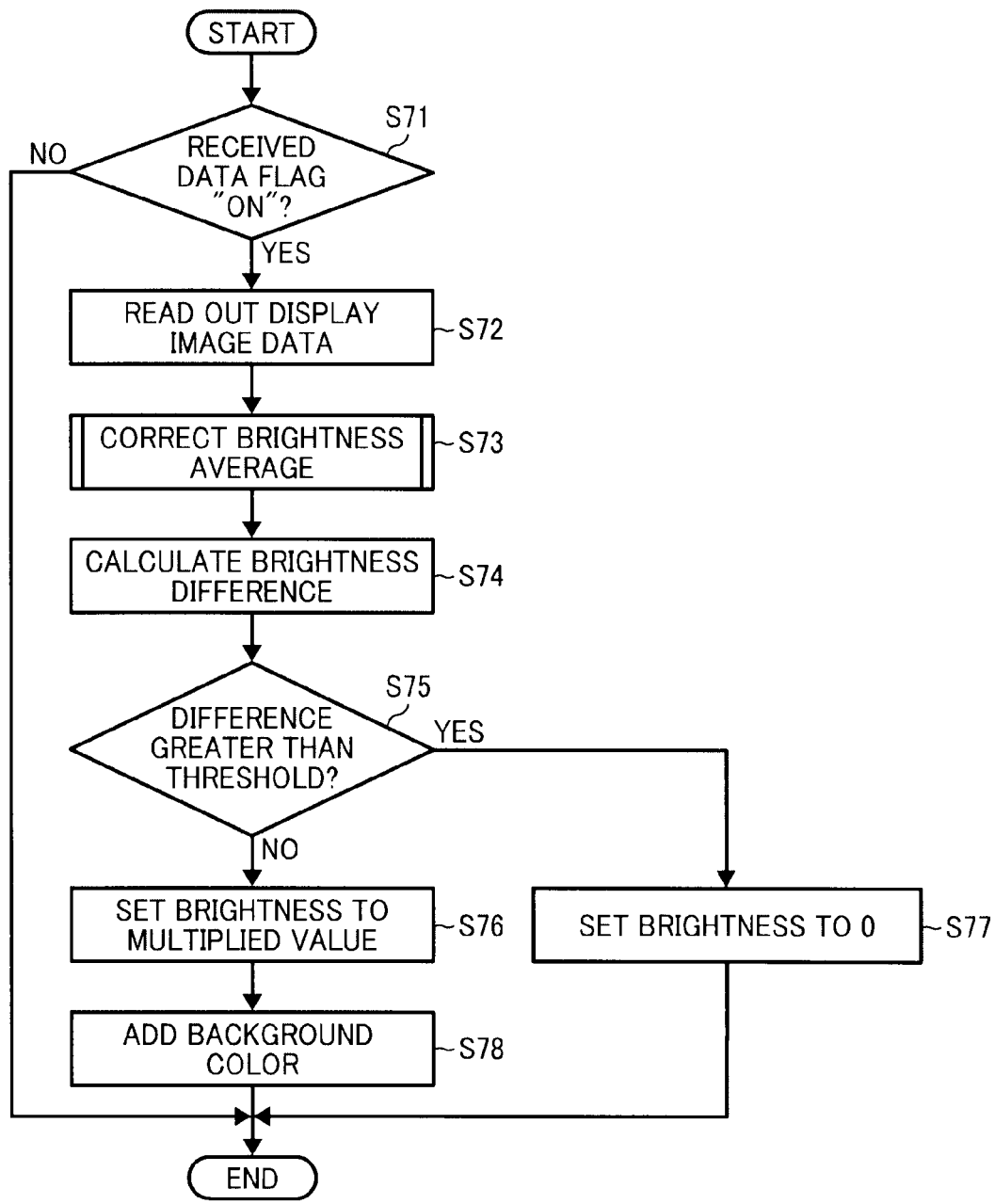
FIG. 6 is a flowchart illustrating operation of generating a differential image from the captured image data, performed by the image processing apparatus of FIG. 2.

Referring now to FIGS. 4 to 6, operation of processing image data, performed by the image processing system 1, is explained according to an example embodiment of the present invention. FIG. 4 is a flowchart illustrating operation of processing captured image data and received image data, performed by the image processing apparatus 10. FIG. 5 is a flowchart illustrating operation of detecting a human object image in the captured image data. FIG. 6 is a flowchart illustrating operation of generating a differential image based on the captured image data.

Referring to FIG. 4, operation of processing captured image data and received image data, performed by the image processing apparatus 10 is explained. In this example, it is assumed that the image processing apparatus 10a at the site A captures an image of the drawing area 201a and the peripheral area 202a using the image capturing device 30a to generate a captured image. Further, it is assumed that the captured image includes an image of the foreground object that is positioned between the object 20a and the image capturing device 30a, such as an image of at least a portion of the user at the site A. Further, it is assumed that the image processing apparatus 10*a* at the site A receives a differential image generated at the site B from the site B as the received image. Since the image processing apparatus 10*b* at the site B is substantially similar in function and operation to the image processing apparatus 10*a* at the site A, explanation of its operation and function is omitted.

The image capturing device 30*a*, which is implemented by a video camera in this example, captures an image of the drawing area 201*a* and the peripheral area 202*a* to generate a captured image. The captured image includes an image of at least a portion of the user as the image of the foreground object that is located between the image capturing device 30*a* and the object 20*a*. In the following examples, the image captured by the image capturing device 30*a* is referred to as the captured image data or the captured image.

Referring to S1 to S7, operation of processing captured image data is explained. At S1, the image obtainer 13 of the image processing apparatus 10*a* determines whether a first timer value reaches a predetermined value. More specifically, in this example, the CPU 101 (FIG. 2) of the image processing apparatus 10*a* is provided with a timer that counts a timer value. The first timer value is set to 0 when the image supplier 16 supplies the received image to the projection device 40*a* (S13). In this example, the first timer value is set such that the image obtainer 13 is able to capture the image that is more stable. For example, the first timer value is set to about tens to a few hundred milliseconds. When it is determined that the first timer value reaches the predetermined value ("YES" at S1), the operation proceeds to S2. When it is determined that the first timer value does not reach the predetermined value ("NO" at S1), the operation repeats S1.

At S2, the image obtainer 13 of the image processing apparatus 10*a* obtains the captured image captured by the image capturing device 30*a*. In one example, the image obtainer 13 sends an instruction for capturing the image to the image capturing device 30*a*, and obtains the captured image from the image capturing device 30*a*. Alternatively, the image obtainer 13 obtains the captured image from the image capturing device 30*a* that is constantly capturing the image of the drawing area 201*a* and the peripheral area 202*a*. The image obtainer 13 stores the captured image in the captured image memory 1001 of the memory 1000 through the memory control 19.

At S3, the image change detector 14 determines whether the captured image captured and stored at S2 contains the image of the foreground object and/or the drawing image that changes from the time when the previously captured image data is taken. More specifically, in this example, the image change detector 14 determines whether the captured image contains the foreground object image, based on whether there is change between the peripheral area 202 extracted from the currently obtained captured image and the peripheral area 202 extracted from the previously obtained captured image. When it is determined that the currently captured image contains the foreground object image, the image change detector 14 determines that the human object is present and sets the human object flag to "ON". When it is determined that the currently captured image does not contain the foreground object image, the image change detector 14 determines that the human object is not present and sets the human object flag to "OFF". Any data that is generated during this process may be stored in the memory.

At S4, the differential image generator 15 determines whether the human object flag is set to "ON" or "OFF". When it is determined that the human object flag is turned off ("NO" at S4), the operation proceeds to S7. When it is determined that the human object flag is turned on ("YES" at S4), the operation proceeds to S5.

At S7, the differential image generator 15 determines whether a second timer value reaches a predetermined value. More specifically, in this example, the second timer value of the timer, which may be provided in the CPU 101 (FIG. 2) of the image processing apparatus 10*a*, is set to 0 when the data transmit/receive 11 transmits the differential image to the image processing apparatus 10*b* at the site B. In this example, the second timer value is set such that the data transmit/receive 11 is able to transmit the differential image to the counterpart site B according to a predetermined frame rate. For example, the second timer value is set to about one second, assuming that the frame rate is set to 1 frame per second (fps). Further, in this example, the second timer value is set greater than the first timer value.

When it is determined that the second timer value reaches the predetermined value ("YES" at S7), the operation proceeds to S5. When it is determined that the second timer value does not reach the predetermined value ("NO" at S7), the operation returns to S1 to process another captured image.

When it is determined that the human object flag is turned on ("YES" at S4), or when it is determined that the second timer value reaches the predetermined value ("YES" at S7), the operation proceeds to S5. At S5, the differential image generator 15 generates a differential image from the captured image and the display image, which is explained below referring to FIG. 6.

At S6, the data transmit/receive 11 transmits the differential image generated at S5 to the image processing apparatus 10*b* through the communication network 50, and the operation ends. The data transmit/receive 11 of the image processing apparatus 10*b*, which receives the differential image from the site A, transmits the differential image to the projector 40*b* as the received image to cause the projector 40*b* to project the received image onto the object 20*b*.

Still referring to FIG. 4, operation of processing the received image data is explained, which are performed at S10 to S14. In this example, S10 to S14 are performed concurrently with S1 to S6. At S10, the data transmit/receive 11 of the image processing apparatus 10*a* receives the differential image that is generated at the site B from the image processing apparatus 10*b* through the communication network 50. In the following examples, the differential image received from another site is referred to as the received image data, the received image, or the drawing image of the other site. Further, in this example, the differential image may be received from the image processing apparatus 10*b* either directly from the image processing apparatus 10*b* or via a server that stores the differential image generated at the image processing apparatus 10*b*.

At S11, the received image memory 1002 stores therein the received image data obtained at S10. The memory control 19 overwrites the previously received image data that is stored in the received image memory 1002, with the newly received image data obtained by the data transmit/receive 11, such that the received image data stored in the received image memory 1002 is constantly updated.

At S12, the image supplier 16 supplies the received image data, which is stored in the received image memory 1002, to the projection device 40*a* through the external device I/F 115. The projection device 40*a* projects a projection image based on the received image data, onto the drawing area 201*a*. At S13, the image supplier 16 sets the first timer value of the timer to 0 when an instruction for displaying the received image data is issued. At S14, the display image memory 1005 writes the projection image that is projected onto the drawing area 201a as the display image data, and the operation ends. S12 to S14 may be performed at substantially the same time.

As described above, the image processing apparatus 10a determines whether the drawing image of the site A has changed between the currently obtained captured image and the previously obtained captured image. In order to detect the change in the captured image data, in one example, the image processing apparatus 10a may determine whether the peripheral area 202a extracted from the currently captured image contains a human object image based on comparison between the peripheral area 202a of the currently obtained captured image and the peripheral area 202a of the previously obtained captured image. When it is determined that the captured image data contains the human object image, the image processing apparatus 10a generates a differential image based on the captured image and transmits the differential image to the other site B, without waiting for a next cycle of transmitting the differential image according to the predetermined frame rate. Since the differential image is transmitted to the image processing apparatus 10b at higher frame rates when it is determined that there is change to the drawing image obtained at the site A, the resultant image received at the site B improves in its quality.

When it is determined that the captured image data does not contain the human object image, the image processing apparatus 10a generates a differential image based on the captured image and transmits the differential image to the other site B, at a next cycle of transmitting the differential image according to the predetermined frame rate.

Further, when the image processing apparatus 10b receives the differential image from the site A at higher frame rates, the image processing apparatus 10b does not capture the image at the site B until the first timer value reaches the predetermined value. Since the image at the site B is not captured until the first timer value reaches the predetermined value, and the first timer value is reset every time that differential image is received from the other site A, the image processing apparatus 10b does not generate or transmit a differential image of its own site.

With the above-described functions, the image processing system 1 is able to effectively control transmission of image data among the sites. For example, it is assumed that the site A has a user who is writing the drawings 200a onto the object 20a, and the site B has no user who stands in front of the object 20b. In such case, the image processing apparatus 10A at the site A detects the human object image in the captured image, and transmits the differential image to the site B at higher frame rates.

In another example, it is assumed that the site A has a user who is writing the drawings 200a onto the object 20a, and the site B has a user who is writing the drawings 200b onto the object 20b. In such case, the image processing apparatuses 10A and 10B both detect the human object image in the captured image, and transmit the differential image to the counterpart site at higher frame rates.

In another example, it is assumed that none of the site A and the site B has a user who is writing the drawings 200 onto the object 20. In such case, none of the image processing apparatuses 10A and 10B detects the human object image in the captured image such that the differential images are exchanged between the sites A and B at lower frame rates.

Referring to FIG. 5, operation of detecting the foreground object image at its own site, performed by the image change detector 14 of the image processing apparatus 10a, is explained according to an example embodiment of the present invention. Operation of FIG. 5 is performed at S3 of FIG. 4.

At S31, the image change detector 14 reads out the captured image data from the captured image memory 1001 of the memory 1000 via the memory control 19 as the currently captured image data. Further, at S31, the image change detector 14 obtains the previously captured image data, from the captured image memory 1001. For example, the previously captured image data may be a captured image that was captured before a predetermined time period or before a predetermined number of captured images were taken, in prior to the time when the currently captured image data is obtained.

At S32, the brightness obtainer 14a obtains the brightness of each pixel, respectively, in the peripheral area 202a of the currently captured image data and in the peripheral area 202a of the previously captured image data that are obtained at S31. The peripheral area 202a may be specified using information regarding the drawing area 201a. For example, the peripheral area 202a may be any area that surrounds the drawing area 201a including a borderline of the corners of the drawing area 201a.

At S33, the difference determiner 14b calculates the brightness difference in each pixel in the peripheral area 202a between the currently captured image data and the previously captured image data, respectively obtained at S31.

At S34, the difference determiner 14b determines, for each pixel in the peripheral area 202a, whether the obtained brightness difference exceeds a predetermined threshold. S32 to S34 are repeated until all pixels in the peripheral area 202a of the captured image data are processed. Any pixel having the brightness difference that exceeds the predetermined threshold is marked as a pixel with the brightness change, or the brightness change pixel.

At S35, the brightness change pixel number determiner 14c obtains a pixel with the brightness difference that exceeds the threshold, as the brightness changed pixel, and counts a total number of brightness changed pixels for the captured image data.

At S36, the brightness change pixel number determiner 14c determines whether the number of brightness changed pixels exceeds a predetermined number. When it is determined that the number of brightness changed pixels exceeds the predetermined number ("YES" at S36), the operation proceeds to S 37. At S37, it is determined that the peripheral area 202a of the currently captured image data contains an image of a human object, and the image change detector 14 causes the memory control 19 to set the human object flag 1004 in the memory 1000 to "ON". When it is determined that the number of brightness changed pixels does not exceed the predetermined number ("NO" at S36), the operation proceeds to S38. At S38, it is determined that the currently captured image data does not contain the human object image, and the image change detector 14 causes the memory control 19 to set the human object flag 1004 in the memory 1000 to "OFF". After S37 or S38, the operation ends to proceed to S4 of FIG. 4.

As described above referring to FIG. 5, by comparing a pixel in the peripheral area between the currently obtained captured image data and the previously obtained captured image data, the change in the foreground object image can be easily detected, without being influenced by the projection image that reflects the image obtained at the other site.

The operation of FIG. 5 may be performed in various other ways. For example, in order to determine whether the difference in brightness in the peripheral area 202 between the currently captured image data and the previously captured image data is sufficiently large, the image change detector 14 may generate a brightness difference image indicating the difference in brightness between the currently captured image data and the previously captured image data. The brightness difference image may be processed into a binary image with a brightness threshold value that is previously set. If a run of continuous pixels having the same color, such as white, is greater than a predetermined number of pixels, the image change detector 14 determines that there is the human object image in the peripheral area 202 of the captured image data.

Further, after the image change detector 14 sets the value of the human object flag 1004 to "ON", the "ON" value of the human object flag 1004 may be kept on at least for a predetermined number of frames, or captured images. This results in generating and transmitting the differential image to the other site at higher frame rates.

Referring now to FIG. 6, operation of generating a differential image performed by the differential image generator 15 is explained. In this example, the differential image generator 15 generates a differential image by subtracting the display image data obtained from the display image memory 1005, from the captured image data obtained from the captured image memory 1001. In this example, it is assumed that the image processing apparatus 10 controls the time when the differential image is to be generated based on determination whether the drawing image at its own site changes.

Referring to FIG. 6, at S71, the flag determiner 15a, determines whether the received image flag 1003 stored in the memory 1000 is turned on or off. When it is determined that the received image flag 1003 is turned off ("NO" at S71), the operation ends. In such case, the differential image is not generated at S7, and the image processing apparatus 10a transmits the captured image data obtained at S1 as the differential image at S6.

When it is determined that the received image flag 1003 is turned on ("YES" at S71), the operation proceeds to S72. At S72, the differential image generator 15 causes the memory control 19 to read out the display image data from the display image memory 1005.

At S73, the brightness corrector 15b corrects a brightness average value of the captured image data and the display image data.

At S74, the brightness average difference calculator 15d calculates a difference value of a target pixel, which is the difference between a brightness value of the target pixel in the captured image data and a brightness value of the target pixel in the display image data read at S72.

At S75, the brightness determiner 15e determines whether the difference value of the target pixel obtained at S74 is greater than a threshold. When it is determined that the difference is equal to or less than the threshold ("NO" at S75), the operation proceeds to S76. When it is determined that the difference is greater than the threshold ("YES" at S75), the operation proceeds to S77. The threshold is any arbitrary value that is previously set. In this example, the threshold is set to −5.

At S76, the brightness determiner 15e sets the brightness difference value of the target pixel to a multiplied value, which is obtained by multiplying the difference brightness value of the target pixel with a constant. In this example, the constant is any number that ranges between 1 and 2.

At S77, the brightness determiner 15e sets the brightness difference value of the target pixel to 0.

At S78, the brightness determiner 15e adds the brightness difference value of the target pixel to the brightness value of the background color, and the operation ends.

S74 to S78 are performed for all pixels in the captured image data and the display image data to generate the difference image having the brightness value that is determined.

The above-described operation of generating a differential image based on the captured image data and the display image data may be performed in various other ways, for example, as described in U.S. Patent Application Publication No. 2011/0210908, published on Sep. 1, 2011, the entire contents of which are hereby incorporated herein by reference.

Numerous additional modifications and variations are possible in light of the above teachings. It is therefore to be understood that within the scope of the appended claims, the disclosure of the present invention may be practiced otherwise than as specifically described herein.

With some embodiments of the present invention having thus been described, it will be obvious that the same may be varied in many ways. Such variations are not to be regarded as a departure from the spirit and scope of the present invention, and all such modifications are intended to be included within the scope of the present invention.

For example, elements and/or features of different illustrative embodiments may be combined with each other and/or substituted for each other within the scope of this disclosure and appended claims.

For example, when transmitting the differential image to the other site after it is determined that the drawing image at one site changes, the differential image to be transmitted may be caused to have a resolution lower than a resolution of the differential image that is transmitted at a regular cycle.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, nonvolatile memory cards, ROM (read-only-memory), etc.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

What is claimed is:

1. An image processing apparatus, comprising: an image receiver to receive a drawing image that reflects drawings drawn onto a second drawing area of a second drawing object located at a remotely located site that is remote from a site at which a first drawing object is located;
   an image supplier to instruct a projection device to project the drawing image of the second drawing area onto a first drawing area of the first drawing object as a projection image, and to store the projection image in a memory;
   an image obtainer to obtain a currently captured image captured by an image capturing device, the currently captured image including a drawing image that reflects drawings drawn onto the first drawing area and the projection image;
   an image change detector to determine whether the drawing image of the first drawing area in the currently captured image changes from a previously captured image that is previously obtained by the image obtainer to generate a detection result;
   wherein the image change detector is configured to:
   extract a peripheral area from the currently captured image, the peripheral area being selected from an area that surrounds the first drawing area;

compare the extracted peripheral area of the currently captured image with a previous peripheral area that is extracted from the previously captured image to generate a comparison result;

and determine that the drawing image of the first drawing area changes from the previously captured image when the comparison result indicates that the extracted peripheral area is different from the previous peripheral area;

a differential image generator to generate a differential image that includes the determined change between the projection image obtained from the memory and the currently captured image when the detection result indicates that the drawing image of the first drawing area changes;

and an image transmit to transmit the differential image to the remotely located site for projection onto the second drawing area of the second drawing object as the drawing image of the first drawing object.

2. The image processing apparatus of claim 1, wherein the image obtainer obtains the currently captured image when a first timer value reaches a predetermined value, the first timer value indicating a time period counted from the time when the image supplier instructs the projection device to project the drawing image of the second drawing area.

3. The image processing apparatus of claim 2, wherein, when the detection result indicates that the drawing image of the first drawing area does not change, the differential image generator generates the differential image when a second timer value reaches a predetermined value, the second timer value indicating a time period counted from the time when a previously generated differential image is transmitted to the remotely located site, the predetermined value of the second timer value being greater than the predetermined value of the first timer value.

4. The image processing apparatus of claim 3, wherein:

the differential image generator is caused to generate the differential image when the first timer value reaches the predetermined value at least for a predetermined time period after the image change detector generates the detection result indicating that the drawing image of the first drawing area changes.

5. The image processing apparatus of claim 1, wherein: the image change detector determines that the currently captured image contains a foreground object image that causes the drawing image of the first drawing area to be changed, when the comparison result indicates that the extracted peripheral area is different from the previous peripheral area.

6. The image processing apparatus of claim 1, wherein the peripheral area is selected from a borderline of the first drawing area.

7. An image processing system, comprising:
the image processing apparatus of claim 1;
the projection device to project the drawing image of the second drawing area onto the first drawing area of the first drawing object; and
the image capturing device to capture an image of the first drawing area and the peripheral area of the first drawing object.

8. An image processing method, comprising:
receiving a drawing image that reflects drawings drawn onto a second drawing area of a second drawing object located at a remotely located site that is remote from a site at which a first drawing object is located;

instructing a projection device to project the drawing image of the second drawing area onto a first drawing area of the first drawing object as a projection image;
storing the projection image in a memory;
obtaining a currently captured image captured by an image capturing device, the currently captured image including a drawing image that reflects drawings drawn onto the first drawing area and the projection image;
determining whether the drawing image of the first drawing area in the currently captured image changes from a previously captured image that is previously obtained to generate a detection result;
extracting a peripheral area from the currently captured image, the peripheral area being selected from an area that surrounds the first drawing area;
comparing the extracted peripheral area of the currently captured image with a previous peripheral area that is extracted from the previously captured image to generate a comparison result;
determining that the drawing image of the first drawing area changes from the previously captured image when the comparison result indicates that the extracted peripheral area is different from the previous peripheral area;
generating a differential image that includes the determined change between the projection image obtained from the memory and the currently captured image when the detection result indicates that the drawing image of the first drawing area changes;
and transmitting the differential image to the remotely located site for projection onto the second drawing area of the second drawing object as the drawing image of the first drawing object.

9. The image processing method of claim 8, further comprising:
counting a time period from the time when the instructing instructs the projection device to project the drawing image of the second drawing area to generate a first timer value; and
causing the obtaining to obtain the currently captured image when the first timer value reaches a predetermined value.

10. The image processing method of claim 9, further comprising:
counting a time period from the time when a previously generated differential image is transmitted to the remotely located site to generate a second timer value;
causing the generating to generate the differential image when the second timer value reaches a predetermined value when the detection result indicates that the drawing image of the first drawing area does not change, the predetermined value of the second timer value being greater than the predetermined value of the first timer value.

11. The image processing method of claim 10, further comprising:
causing the generating to generate the differential image when the first timer value reaches the predetermine value at least for a predetermined time period after the detection result indicating that the drawing image of the first drawing area changes is generated.

12. A non-transitory computer-readable recording medium storing a plurality of instructions which, when executed by a processor, cause the processor to perform an image processing method, the method comprising:
receiving a drawing image that reflects drawings drawn onto a second drawing area of a second drawing object located at a remotely located site that is remote from a site at which a first drawing object is located;

instructing a projection device to project the drawing image of the second drawing area onto a first drawing area of the first drawing object as a projection image;

storing the projection image in a memory;

obtaining a currently captured image captured by an image capturing device, the currently captured image including a drawing image that reflects drawings drawn onto the first drawing area and the projection image;

determining whether the drawing image of the first drawing area in the currently captured image changes from a previously captured image that is previously obtained to generate a detection result;

extracting a peripheral area from the currently captured image, the peripheral area being selected from an area that surrounds the first drawing area;

comparing the extracted peripheral area of the currently captured image with a previous peripheral area that is extracted from the previously captured image to generate a comparison result;

determining that the drawing image of the first drawing area changes from the previously captured image when the comparison result indicates that the extracted peripheral area is different from the previous peripheral area;

generating a differential image that includes the determined change between the projection image obtained from the memory and the currently captured image when the detection result indicates that the drawing image of the first drawing area changes;

and transmitting the differential image to the remotely located site for projection onto the second drawing area of the second drawing object as the drawing image of the first drawing object.

* * * * *